United States Patent [19]
Baumann

[11] Patent Number: 6,117,275
[45] Date of Patent: *Sep. 12, 2000

[54] PROCESS AND DEVICE FOR REGENERATING A CONTAMINATED SOLVENT

[75] Inventor: Walter Baumann, Eisenach, Germany

[73] Assignee: Didda Maria Janina Baumann, Wurzburg/Lengfeld, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/894,666

[22] PCT Filed: Mar. 1, 1996

[86] PCT No.: PCT/EP96/00859

§ 371 Date: Apr. 14, 1998

§ 102(e) Date: Apr. 14, 1998

[87] PCT Pub. No.: WO96/26780

PCT Pub. Date: Sep. 6, 1996

[51] Int. Cl.[7] .............................. B01D 1/00; B01D 3/42; B01D 5/00
[52] U.S. Cl. .............................. 203/1; 159/44; 159/47.1; 159/901; 202/160; 202/170; 202/176; 202/179; 202/181; 202/200; 203/2; 203/14; 203/71; 203/87
[58] Field of Search .............................. 203/1, 2, 3, 88, 203/100, 14, 71, 91, 87, DIG. 7, DIG. 18; 202/181, 179, 160, 176, 206, 205, 170, 200; 159/44, 47.1, 90.1, DIG. 40, DIG. 16, 2.1; 165/200, 201, 911, 913

[56] References Cited

U.S. PATENT DOCUMENTS

| 2,881,116 | 4/1959 | Siegfried . | |
|---|---|---|---|
| 3,214,349 | 10/1965 | Kehoe et al. | 202/52 |
| 3,289,736 | 12/1966 | Rosenblad | 202/206 |
| 4,276,125 | 6/1981 | Issei | 203/98 |
| 5,262,013 | 11/1993 | Beal et al. | 203/2 |

FOREIGN PATENT DOCUMENTS

| EP21021 | 1/1981 | European Pat. Off. . |
| EP236813 | 9/1987 | European Pat. Off. . |
| EP284341 | 9/1988 | European Pat. Off. . |
| WO9324198 | 12/1993 | WIPO . |

OTHER PUBLICATIONS

Hydrocarbon Processing & Petroleum Refiner, Automatic Control for Distillation, vol. 42, No. 2, pp. 108–121, Feb. 1963.

Camp, "Integrated Control System Improves Evaporator, Performance", pp. 26–27, Jun., 1950.

Primary Examiner—Virginia Manoharan
Attorney, Agent, or Firm—Norris, McLaughlin & Marcus, P.A..

[57] ABSTRACT

Process and apparatus for regenerating a contaminated solvent wherein said solvent is first separated from higher-boiling contaminants in an evaporator, and then contaminants having a lower boiling point than said solvent are separated out in a condenser in which the temperature of said lower-boiling contaminants coming out of said condenser and the temperature of said solvent coming out of said condenser are separately controlled.

15 Claims, 6 Drawing Sheets

PROCESS AND DEVICE FOR REGENERATING A CONTAMINATED SOLVENT

The disclosed invention concerns a process and device for regenerating a contaminated solvent by separating out the impurities.

BACKGROUND OF THE INVENTION

Dry cleaning of, e.g. non water resistant garments is done with organic solvents.

But the organic solvent alone would not be able to remove water soluble dirt from textiles, unless certain quantities of water and auxiliaries, which form water-solvent-emulsions, are added to it.

The solvent circulates in the machine and is regenerated after each batch cycle. During the regeneration of the solvent, all foreign substances such as the dirt from the cleaned textiles, the auxiliaries and the water must be removed from the solvent as completely as possible. The regenerated solvent is then fed back into the process.

In the past and up until now, low-boiling halogenated hydrocarbons were the most often used solvents. Because of their low boiling points, regeneration by distillation is relatively simple. Most contaminating substances found in the solvent have higher-boiling temperatures than the solvent itself does. Therefore, after vaporization of the solvent in a single-stage batch distillation, the foreign substances can be removed as a residue from the still. This residue is then disposed of. Water, with a boiling temperature that is lower than that of the tetrachlorethene (boiling temperature 121° C.) is vaporized and recondensed together with the solvent. Since it is not miscible with the solvent, it can then be easily separated by deposition.

Because the halogenated hydrocarbons cannot be decomposed by natural biological process, they are as far as possible replaced by paraffin hydrocarbons for reasons of environmental protection. These mediums are decomposed in a few days by natural processes in the soil, as well as in the atmosphere. Since the hydrocarbons are inflammable for safety reasons, a fraction boiling between about 180° C. and about 200° C. is used.

These products have good properties for dry cleaning and can be handled without danger even outside of the machine. Solvent regeneration by vacuum-distillation at an absolute pressure of about 50 mbar to 100 mbar is generally used. Atmospheric distillation would thermally decompose most of the impurities in the contaminated solvent.

The vacuum distillation generally used today is a single-stage batch distillation, principally the same process as is used for distillation of low-boiling halogenated hydrocarbons.

Experience gained in commercial operation shows that as a consequence of the high-boiling temperature of the currently used hydrocarbon solvents, many of the contaminating foreign substances having boiling points between about 130° C. and about 190° C. remain in the distillate, because they vaporize and recondense together with the solvent. The impurities coming from the cleaned goods into the cleaning-solvent contain bad smelling components, such as fatty acids, which accumulate in the solvent from cleaning cycle to cleaning cycle. Since there are also substances present that form an emulsion of solvent and water, water cannot be totally separated from the distilled solvent by sedimentation.

The emulsified water keeps organic compounds dissolved, and in this way additionally bad smelling substances therefore become enriched.

Therefore, it has been found necessary to separate from high-boiling solvents not only those impurities which have a boiling temperature above that of the solvent itself, but also those whose boiling temperature is below that of the solvent itself. Experience shows that in regeneration of high-boiling solvents by single-stage batch distillation, bad smelling substances are enriched and concentrated. Satisfactory removal of these substances is difficult, because even contents of about 0.1% or less in the solvent cause intolerably bad smells. The reciprocal influence of the components on their boiling temperatures (Raoult's Law) increases the difficulty of separation in the stage of vaporization.

The high selectivity of separation which is necessary to remove even very small amounts of impurities from the solvent cannot be obtained by presently existing solvent recovery systems in textile dry cleaning machines.

In the chemical industry, a high separation effect during vaporization is achieved by application of numerous fractionating trays and by a high reflux ratio.

This technology, however, is not suitable for commercial textile dry cleaning, because the equipment would be too large and too expensive.

On the other hand, all the substances of dirt, with higher or with lower-boiling temperatures compared to the solvent itself, even if they are present in a very low percentage, must be removed from the solvent to avoid their enrichment, because a dry cleaning process for human clothes that deposits bad smelling substances on the goods is intolerable.

According to the state of the art, International Patent application PCT/EP93/01361 discloses a fractional vacuum distillation. This process, whose main aim is the recovery of enthalpy of vaporization, is too complicated for commercial use, and the flash evaporator used is not suited to the conditions of textile dry cleaning. The decisive disadvantage, however, is that the separation parameters, such as the condensation temperature of the distillate and the temperature of the vapor state foreign substances escaping the condenser, cannot be adjusted independent of one another. So a sufficient separating-out of small and even varying contents of impurities is impossible. Therefore, the aim of the present invention is a process and device for regenerating a contaminated solvent by removal of the impurities with high selectivity even if the quantity of impurities is very small and variable.

SUMMARY OF THE INVENTION

In accordance with the present invention, there is provided a process for the recovery of pure solvent and contaminants from contaminated solvents comprising a first step of separating contaminants whose boiling point is higher than the boiling point of the pure solvent in an evaporator (26), and in a second step, separating contaminants whose boiling point is below the boiling point of the pure solvent in a condenser (40), the pure solvent being condensed out in the condenser (40) and carried away, and the contaminants whose boiling point is below the boiling point of the pure solvent, as well as any water being carried out of the condenser (40) in vaporous state, the temperature of the vaporous contaminants upon leaving the condenser (40), and the temperature of the condensed pure solvent leaving the condenser (40) being regulated independently of each other, as follows, by means of a closed separate cooling circuit whose coolant flows through the condenser:

the temperature of the coolant upon entering the condenser (40) is regulated by means of a regulating system associated with the coolant circuit, whereby the temperature of the vaporous contaminants leaving the condenser (40) is adjusted; and the temperature of the condensed pure solvent upon leaving the condenser (40) is regulated by the rate of flow of the coolant flowing through cooling tubes of the condenser.

In accordance with a further aspect of the invention, there is provided an apparatus for the recovery of pure solvent and contaminants from contaminated solvent, comprising an evaporator (26) for the separation of contaminants whose boiling point is higher than the boiling point of the pure solvent, and a condenser (40) following the evaporator (26) for the separation of contaminants whose boiling point is lower than the boiling point of the pure solvent, the condenser (40) having an inlet for the vapor coming from the evaporator (26), as well as an outlet for the vaporous contaminants whose boiling point is lower than the boiling point of the pure solvent, wherein coolant from a closed, separate cooling circuit flows through the condenser (40), the closed cooling circuit having a regulating system (58,59) for adjusting the temperature of the coolant upon entry into the condenser (40), and thereby the temperature of the vaporous contaminants upon simultaneous exit from the condenser (40), the closed cooling circuit having a circulation pump (60) for regulating the rate of flow of the coolant in the condenser, which thereby adjusts the temperature of the condensed pure solvent as it leaves the condenser (40).

DETAILED DESCRIPTION

The process and device according to this invention are especially suitable for the regeneration of soiled solvents coming from textile dry cleaning. But they are also generally advantageously applicable when a liquid medium has to be cleaned from impurities having higher and lower-boiling temperatures than that of the contaminated medium.

For regeneration of the contaminated solvent, a process and an apparatus have been developed by which the impurities can be separated out with high selectivity. To avoid the problem of elevation of the boiling point of the lower-boiling components as a result of their low mol-fraction, the separation of these components is accomplished in the gaseous phase by fractional condensation.

By use of the latter described apparatus for evaporation and the following recondensation of the solvent in the distillation process, it was found that even when there are emulsifying components present in the feed solvent, the distillate produced after the distillation is totally free from water. So a satisfactory removal of all lower-boiling and bad smelling components is achieved.

An accurate adjustment of the temperature which is necessary for a high selectivity of separation is obtained in accordance to the present invention. A high separation effect is obtained by independent, stable and precise adjustment of the temperatures at the liquid condensate (pure distilled solvent) outlet, as well as at the outlet of the vapor stage lower-boiling impurities. The adjustment of temperature is performed by a separate closed cooling liquid circulation, with control of the temperature of the cooling liquid by thermostat and independent control of coolant flow rate.

An essential advantage of the herewith disclosed process and device is that the distillation is performed with a small inventory of substance inside the apparatus. By the special design of the feed tank and of the evaporator, a boil-over in the distillation process can certainly be avoided. This boil-over in the distillation of solvents coming from textile dry cleaning is a frequently occuring and unpleasant event, because when this happens, even those parts of apparatus which are normally in contact only with clean distillate are soiled.

In the evaporator described in the following, most of the lower-boiling foreign products are vaporized in the upper part of the evaporator without reaching the bath of boiling liquid. Also, the small quantity of liquid and the low-energy content of the boiling liquid bath enable the avoidance of boil-over.

The hold-up time of the contaminated solvent in the evaporator is only a few minutes. Because of this, thermal decomposition of the foreign components in the solvent is avoided, and consequently, the new formation of bad smelling cleavage products is also avoided. Growing of microbes in the distillate is avoided because the distillate of this process is free of water; bacteriostatic additives are therefore not needed.

Another advantage of the disclosed process and device is that the distillation residue containing the higher-boiling impurities can be discharged automatically by the control system of the installation. The process self-adjusts to varying contents of foreign matter. The residue is extracted over a lock system to a tank for disposal by programmed control and without manual handling.

BRIEF DESCRIPTION OF THE DRAWINGS

The present invention is more specifically described in the following with regard to the drawings which show.

Figure 1:
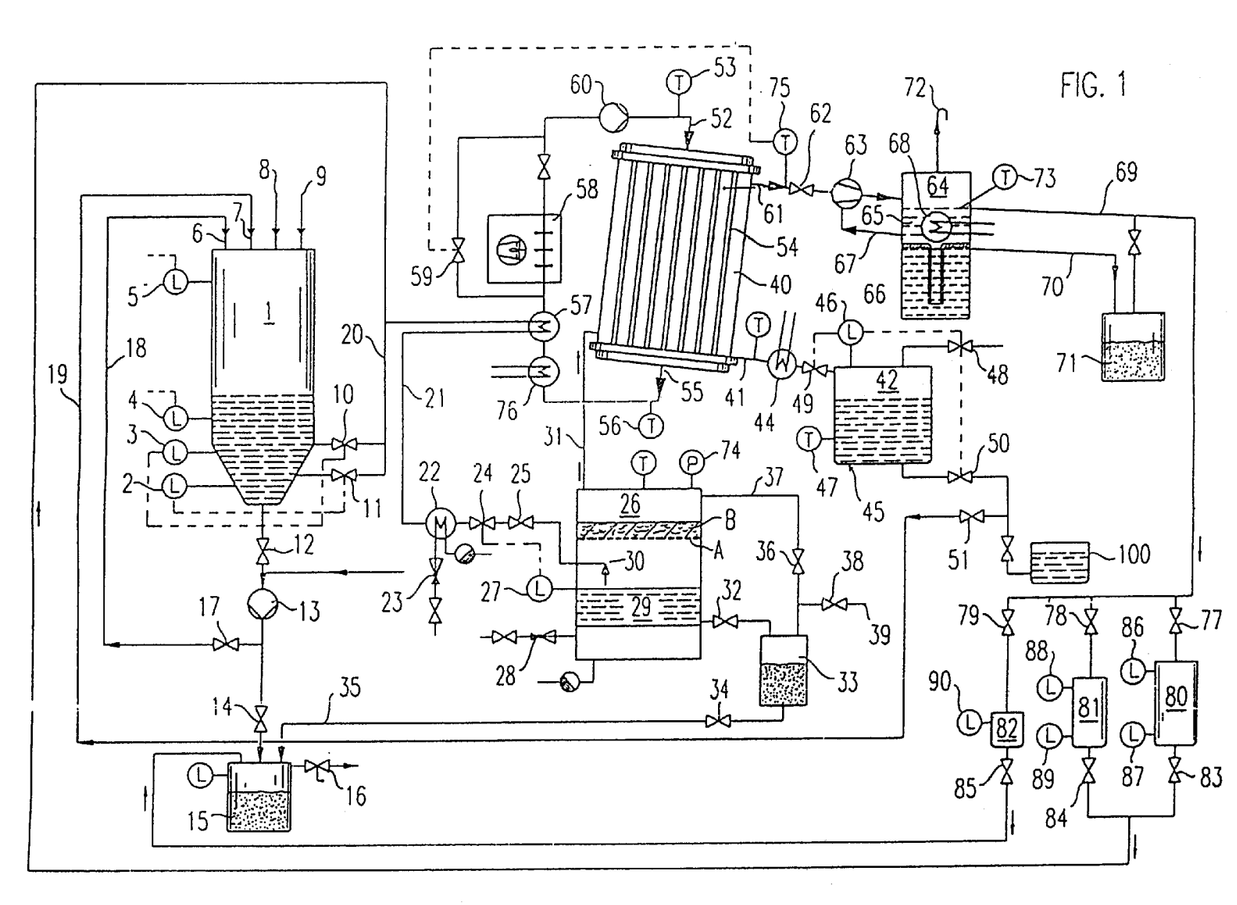
FIG. 1 a general plan of a preferred construction of the present invention.
Figure 2:
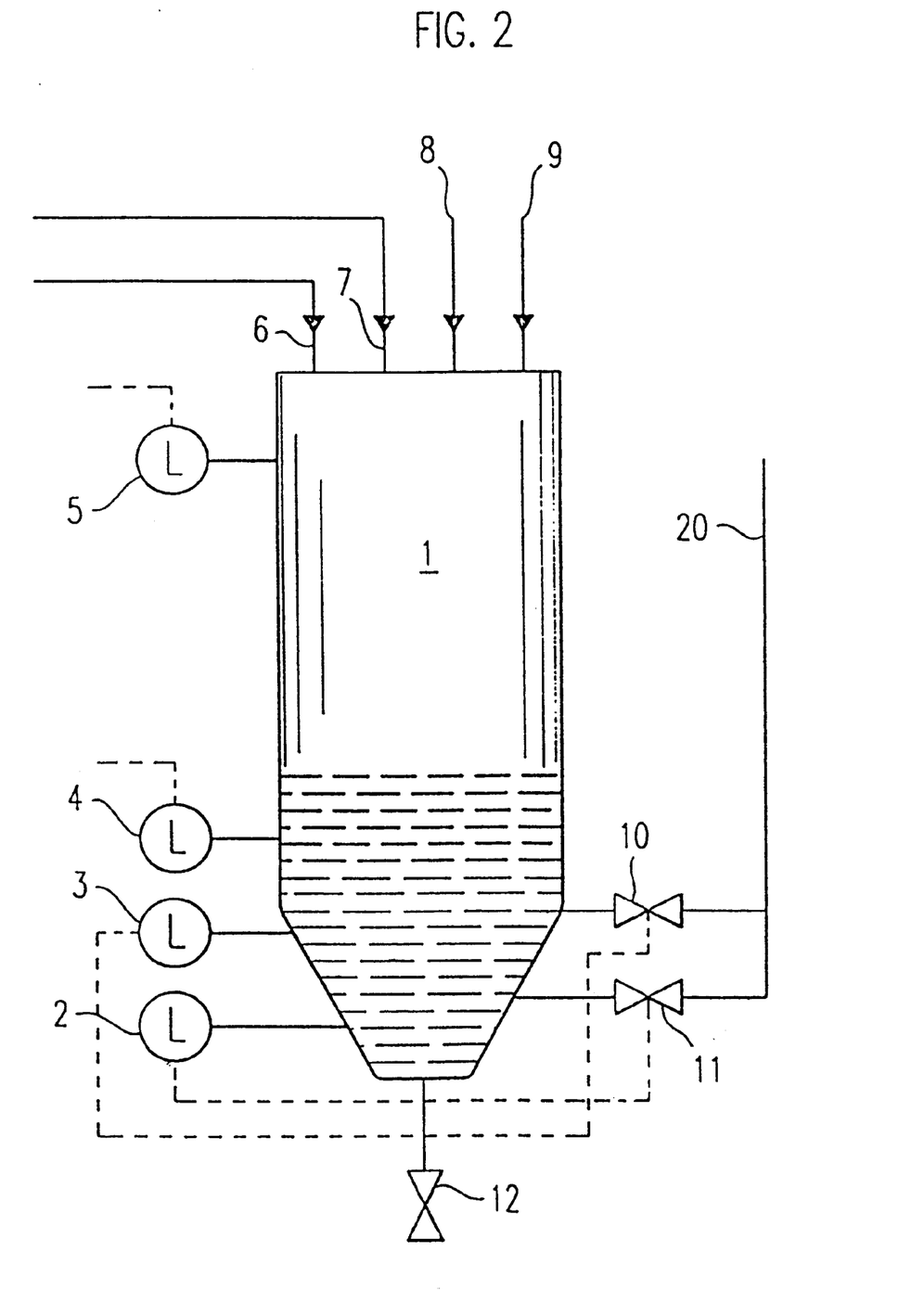
FIG. 2 schematically, a decantation tank according to the invention.

The process is as follows:

As illustrated in FIG. 1 and FIG. 2 contaminated solvent coming batchwisely from a dry cleaning machine is led by pipe 8 to decantation tank 1 of the distillation plant. This decantation tank 1 contains devices which ensure that the distillation plant is fed continuously with contaminated solvent and emulsified water, but without the danger that sedimented water or highly concentrated sedimented sludge will enter the still.

Pure water would cause a sudden drop of the vacuum by its high vapor pressure and a sudden drop of temperature by its high evaporation enthalpy. Concentrated sludge would clog the pipes. Therefore, the decantation tank is equiped with special devices to prevent water or sludge from being fed to the distillation and assure a continuous operation.

The conical lower part of feed tank 1 has outlet nozzles with valve 10 and valve 11 in different altitudes. Just below outlet valve 11 is a float switch 2. Below valve 10, but higher than valve 11, a float switch 3 is installed. These float switches are designed so that they float in water (spec. weight=1) but not in solvent (spec. weight=0.74). If pure water accumulates up to level switch 2, this switch will rise up and close valve 11. The outlet of solvent to the distillation will then be through open valve 10, at a higher level. The corresponding level switch 3 is sunk down, indicating the presence of solvent. In this way, only contaminated solvent without higher percentage of water flows to the still. In case of an extremely high content of water, level switch 3 could also be below water level, and so valve 10 would be closed and feed of distillation is automatically interrupted. The water is then conducted over valve 12, sludge pump 13 and valve 14 to waste container 15 or, if the water contains still a higher percentage of solvent, it is conducted over valve 17, pipe 18 and inlet 6 back into tank 1 to settle once more.

Float switches 4 and 5 are adjusted so that they float in solvent (spec. weight 0.74). They indicate the highest and the lowest level in tank 1. If switch 5 is down, but switch 4 is up, the content of tank 1 can be discharged to distillation through valve 10 until its niveau is reached. Position of float switches 2, 3, 4 indicates how much solvent and how much water is contained in the tank. The outlet is controlled by these switches. If switch 3 is up and indicates water at its position, but switch 4 is down and indicates that no solvent exists at its position, the distillation plant is automatically stopped. Level switch 5, which floats in solvent (spec. weight 0.74) indicates the highest level and closes the outlet of solvent from machine to tank 1 to avoid over-fill of tank 1.

Solvent-containing residue from the spin filters of the machine is conducted into tank 1 by pipeline 9.

By described control equipment in tank 1, according to this invention, the distillation plant is fed simply and cheaply with solvent, and boil-over, which would trouble the separation process, is certainly avoided. Sedimented solid matter or water are conducted to the waste container or back to resedimentation over pipeline 18 and valve 17 without loss of solvent. By tank 1 and its described devices, a continuous distillation process is ensured without manual handling and with low control equipment expenditure.

Solvent from tank 1 is conducted through pipeline 20, heat exchanger 57, pipeline 21, steam heated heat exchanger 22, and control valve 24 to evaporator 26, as shown in FIG. 1.

Evaporator 26 is operated under vacuum or under atmospheric pressure, depending on the boiling temperature of the treated medium.

Figure 3:
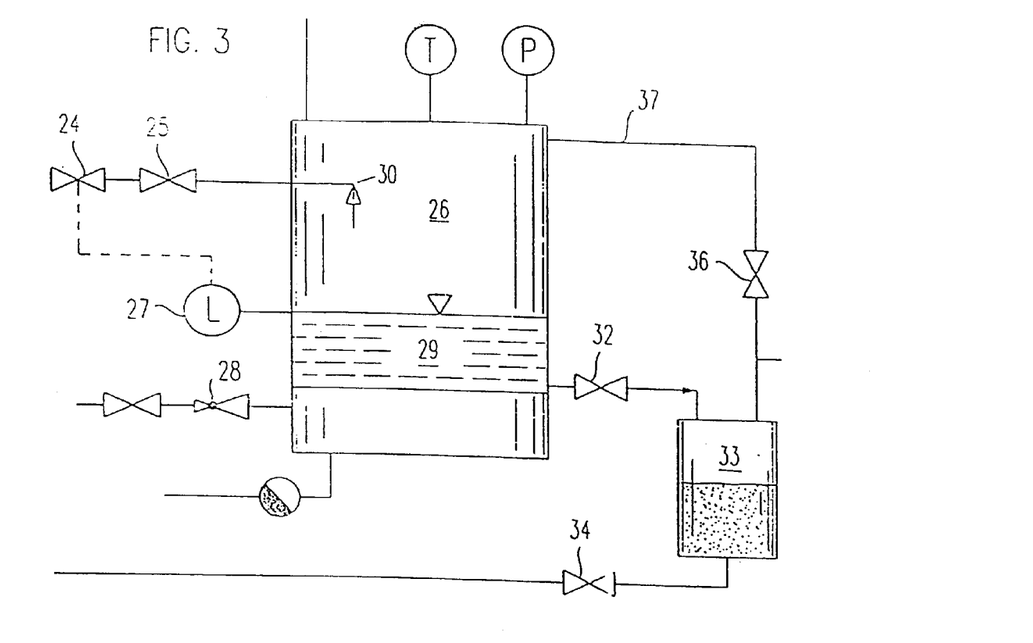
FIG. 3 schematically, an evaporator according to the invention.

The lower part of evaporator 26 contains a steam heated bottom which is adjusted to the temperature of distillation by control of steam pressure by reduction valve 28, as shown in FIG. 3. The solvent bath 29 has a volume which is equal to 5% to 20% of the hourly throughput of the distillation.

Height control 27 manages inlet valve 24, so inlet always equalizes the loss of liquid by evaporation.

The choke valve 25 ensures that the vacuum from evaporator 26 will not extend to heater 22, to avoid evaporation here.

The pressure of the heating steam in heat exchanger 22 is controlled by pressure balance 23, and in that way that solvent temperature at inlet 30 of evaporator 26 is maintained about 10° C. to 20° C. higher than the temperature of boiling bath 29. By this overheating about 10% of incoming solvent and also the lower-boiling components are evaporated in the upper part of evaporator 26, without reaching the boiling bath 29 of solvent.

The overheating enthalpy at inlet 30 would be large enough to evaporate 1% water from solvent in the upper part of evaporator 26. So emulsified water in the solvent does not reach the boiling bath 29.

Contaminated solvent from a dry cleaning meachine is laden with high-boiling foreign substances, depending on the type of cleaned ware and on the auxiliaries used. These high-boiling materials remain as a sludge on the bottom of evaporator 26 during distillation. This occurs especially in dry cleaning of leather, where high-boiling oils having boiling temperatures in excess of 250° C. are added to the cleaning bath. Because the content of high-boiling components increases at the bottom of the evaporator, the boiling point of the remaining bath is elevated, and as a consequence, evaporation rate and pressure in the evaporator drop. The temperatures of bath 29 and evaporator 26 are then automatically elevated by the heated bottom. Therefore, despite the lower vapor pressure, the same quantity of low-boiling components and of water are evaporated. This results in an automatic adjustment of distillation throughput in accordance with the varying content of dirt in the solvent.

The design of evaporator 26 and of the described devices, according to this invention, make automatic drain of distillation residue possible even if the quantity of residue is widely varying and undetermined.

Drain of the residue is described as follows:

Inlet valve 24 is closed by the control system of the distillation plant, and the connection of level switch 27 is interrupted. Heating of evaporator by valve 28 is continued.

Because the volume of bath 29 has been adjusted to from 5% up to 20% of the hourly throughput of distillation plant, the content of bath 29 is vaporized in 3 to 12 minutes. Only the residue remains on the bottom of the evaporator. After the said 3 to 12 minutes, drain valve 32 and ventilation valve 36 in pipeline 37 between sludge container 33 and upper part of evaporator are opened automatically. The hot residue flows from evaporator 26 to sludge container 33. Some minutes later, valve 32 is closed, inlet valve 24 is opened, and the connection between level switch 27 and inlet valve 24 is closed again. Injection of preheated solvent into the evaporator starts again, solvent bath 29 is filled up to the set level, and distillation takes place as normal.

After closing of drain valve 32, ventilation valve 36 between sludge container 33 and evaporator 26 is closed. Then valve 38 is opened, and nitrogen with a pressure of about 0.5 bar is conducted from the nitrogen plant of the dry cleaning machine through pipeline 39 into container 33 to pressure the sludge through opened valve 34 and pipeline 35 into waste container 15. In so doing, a sufficient amount of nitrogen is conducted into waste container 15 that residual air from container 15 has escaped through over-pressure valve 16. Then container 15 contains only sludge and nitrogen. This is necessary because distillation residue from container 33 enters container 15 at a temperature higher than the flash point of the solvent. After cool down of residue in container 33 it would be also possible to transport it by compressed air.

In distillation of highly soiled and foaming liquids, boil-over easily occurs. Foam particles containing the original contaminated liquor are thereby transported into the pure distillate fraction, making the clean fraction dirty and useless. Normally, foaming can be avoided by adding antifoaming agents. But even in this case, a really clean distillate fraction can only be obtained by considerable reduction of throughput of distillation. This reduction can be down to one-third or less of design capacity of the distillation plant.

If then, even only momentarily, non-vaporized particles reach the distillate fraction, the total content of the clean product tank can be soiled. This effect is very unpleasant in dry cleaning of highly-soiled work gloves and workwear and of darkly dyed leather clothes. A garment is most critical when it is dry cleaned the first time.

Figure 4:
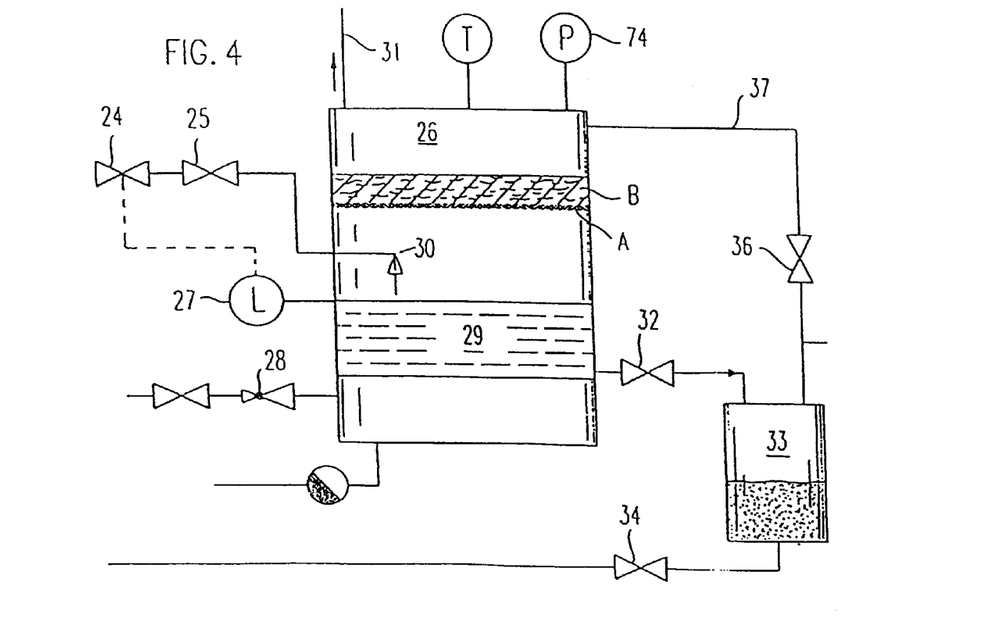
FIG. 4 an evaporator as in FIG. 3 with an additional filter layer.

By a device according to FIG. 4, foaming can be limited to an extent small enough to prevent transport of particles of dirt into the distilled fraction even at full-power distillation.

FIG. 4 shows evaporator 26 with its inlet and outlet pipes. By valve 28, heating steam is conducted under the bottom of the evaporator and the steam condensate is let off by the shown steam trap. The contaminated solvent to be distilled is injected into the evaporator passing valves 24 and 25 and injection jet 30 in the center of evaporator or excentrical to it.

The boiling solvent bath on the bottom of the evaporator is kept at a volume corresponding to 5% to 20% of the hourly throughput of the distillation plant by level control 27. Principally, the level should only be high enough to make reliable level measurement possible.

Furthermore, transit of particles of dirt from evaporator 26 into condenser 40 can be reliably avoided, even in case of highly-contaminated liquor in evaporator 26, by installation of a layer of filter material in evaporator 26, such as shown in FIG. 4. The distilled fraction is clear and colorless.

Advantageously, the filter layer is installed in evaporator 26 above the point of injection 30, e.g. 10 cm over the surface of the bath, e.g. the filter layer can consist of one or more wire meshes A and perhaps in between a metal wool fleece B. Thickness of fleece can be 1 cm or more. The filter layer can be self-supporting or can be borne by a support device inside evaporator 26.

Experience shows that the boiling process is not influenced, solvent vapor passes the layer without any problem, but particles of foam and all liquor drops are retained, when using the filter layer. Consequently, no transit of dirty liquor particles into the distilled fraction occurs, and the product is clean, even at full-power distillation.

Figure 5:
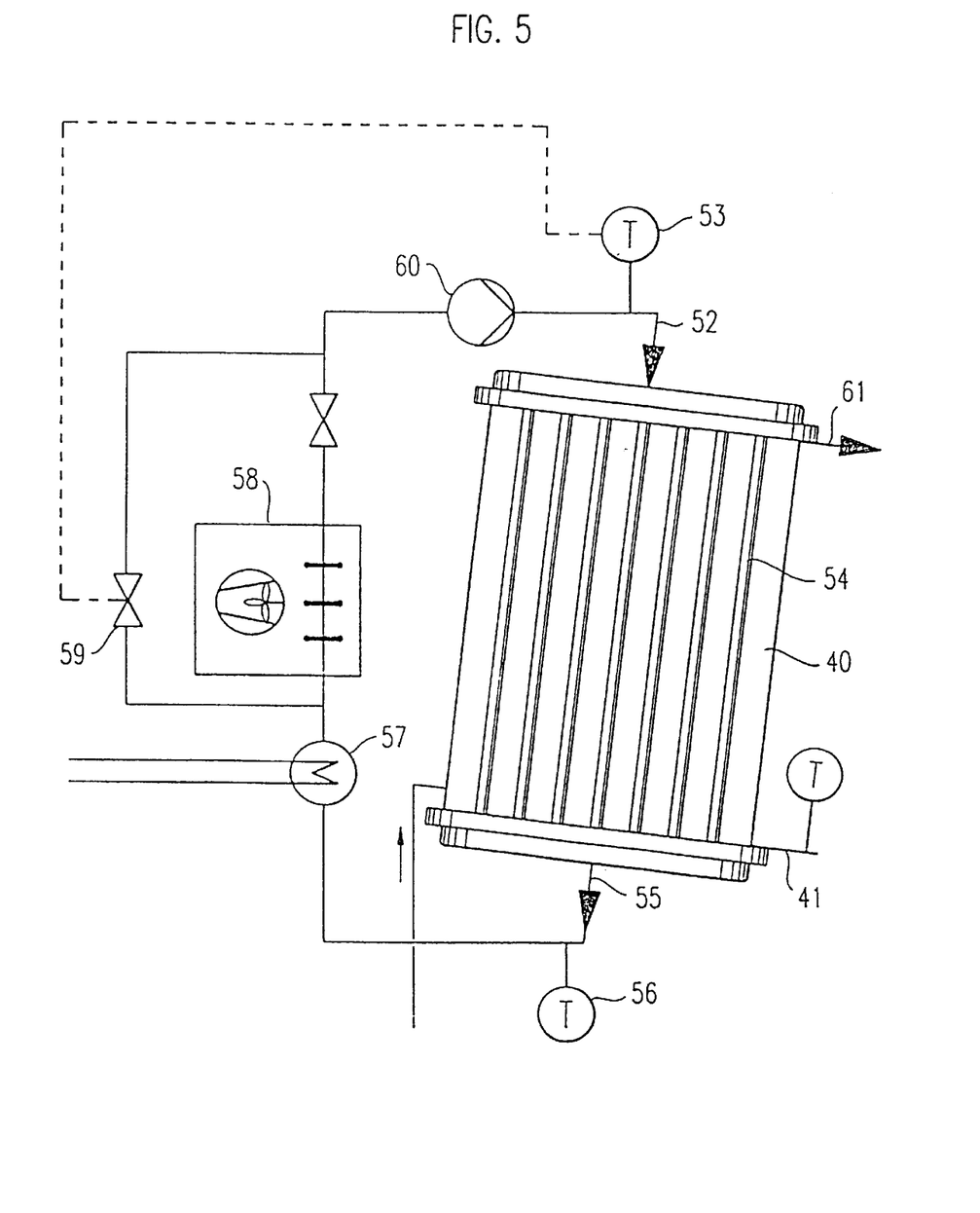
FIG. 5 schematically, another example of construction of the condenser according to the invention, FIG. 6 the condenser according to the invention shown in FIG. 1, in detail, FIG. 7 schematically, a liquid ring pump with a ring liquid precipitator according to the invention.
Figure 6:
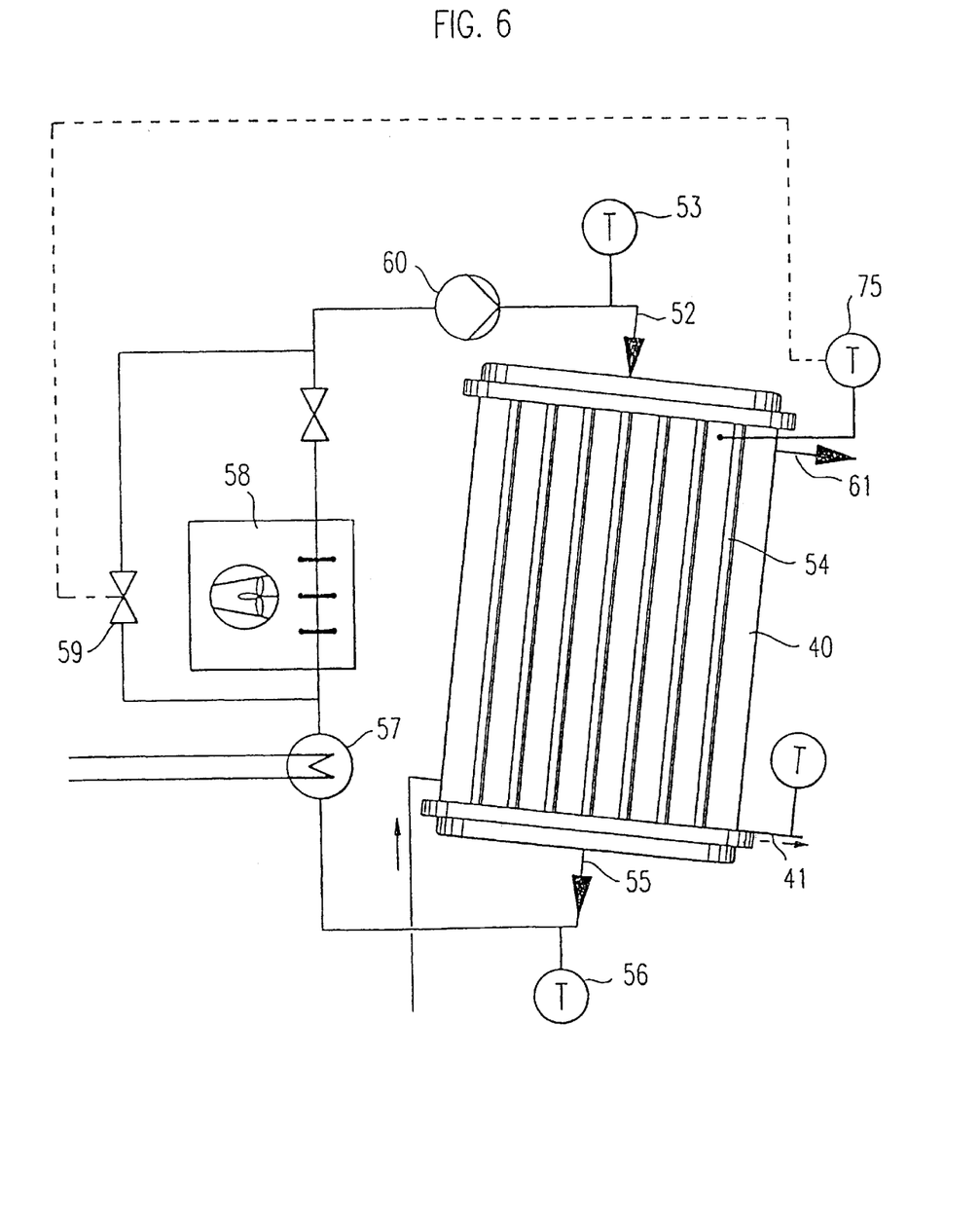

After the high-boiling components are separated out from the contaminated solvent in evaporator 26, the mixture of solvent vapor and lower-boiling components are conducted into condenser 40 by pipeline 31, as shown in FIG. 1. Solvent vapor enters the condenser 40 at its bottom. Condenser 40 contains vertical cooling pipes 54, which have inside vertical flow of coolant from the inlet at top (pipe 52) to the outlet at the bottom (pipe 55) as shown in FIG. 5 and FIG. 6.

The mixture of vapors entering through pipe 31 flows inside condenser 40 from bottom to the top, counter to coolant flow.

The main problem of fractional condensation is that condensation must be carried out at a high temperature, and this temperature must be adjusted and held exactly in dependance of the boiling temperatures of the components which have to be separated. This is done in the following manner:

Coolant flows in a closed circuit from outlet 55 of condenser 40 passing a thermometer 56, a heat exchanger for heat recovery 57, a liquid or air-cooled heat exchanger or cooler 58, an adjustable circulation pump 60 back to inlet 52 of condenser 40 and its cooling pipes 54. The inlet of coolant 52 is at the same end of condenser 40 as the outlet 61 of the vapor state lower-boiling components. The outlet of coolant 55 is at the same end as the inlet 31 of the vapor from evaporator 26 and the outlet of pure distillate fraction 41.

The lower-boiling fraction at outlet 61 should not contain too much uncondensed solvent. The content of lower-boiling components remaining in the pure solvent fraction at outlet 41 becomes lower with increasing temperature of coolant at its outlet 55, and increasing the temperature of the pure solvent fraction at its outlet 41.

On the other hand, the lower the temperature of coolant at its inlet 52 into condenser 40 and as is the lower the temperature of escaping lower-boiling components at outlet 61 are, the lower is the content and by this the loss of solvent in the lower-boiling fraction.

In summary: A high temperature of coolant at the inlet of the condenser causes a high loss of solvent. A low temperature at outlet of coolant from the condenser causes a low purity of distilled solvent.

As seen in FIG. 6, in the cooling circuit of condenser 40, heat exchanger 57 is arranged such that about 50% of the total energy demand of the distillation is recovered by preheating the solvent before it enters the evaporator. The remaining heat at a temperature of e.g. 80° C. to 100° C. in distilling n-Undecan® at a pressure of 100 mbar, is removed by cooler 58, whose outlet temperature is controlled by thermocontrol 75 and bypass control valve 59. By this means coolant at inlet 52 is regulated in dependance of temperature 75 of escaping low-boiling components.

In this way the temperature of the coolant at its inlet to condenser 40 can be adjusted so that the composition and purity of the low boiling components' fraction at outlet 61 reach demanded values.

The coolant temperature at outlet 55 of condenser 40 is adjusted by the circulating quantity of coolant, depending on set-up of variable capacity pump 60.

Coolant temperature at outlet 55 is always higher than at inlet 52. The difference of these temperatures becomes smaller as the circulating quantity of coolant is increased.

By this, the quality of distilled fraction at outlet 41 and the loss of main product (solvent) can be adjusted independently of each other.

FIG. 5 shows condenser 40 from FIG. 1 with a different type of temperature control. Temperature is given by thermometer 53 at coolant inlet.

FIG. 6 shows in detail the example of arrangement of FIG. 1, which makes possible a quick and precise regulation of temperature of lower-boiling components at top 61 of condenser. Coolant temperature at inlet 52 of condenser 40 is directly controlled by the temperature of the escaping lower-boiling components. Thermometer 75 controls air or water cooler 58 by its bypass valve 59.

The temperature at top 61 of the condenser directly influences bypass valve 59 of cooler 58 and by this it controls coolant temperature at inlet 52 to the condenser independently from the quantity of circulating coolant. Quantity of circulating coolant is adjusted manually or by automatic control so that the demanded difference of temperature between inlet 52 and outlet 55 is achieved.

This arrangement guarantees a quick and reliable control of temperatures and by this, the high-selectivity, which is necessary for the satisfactory separating out of lower-boiling impurities.

Figure 7:
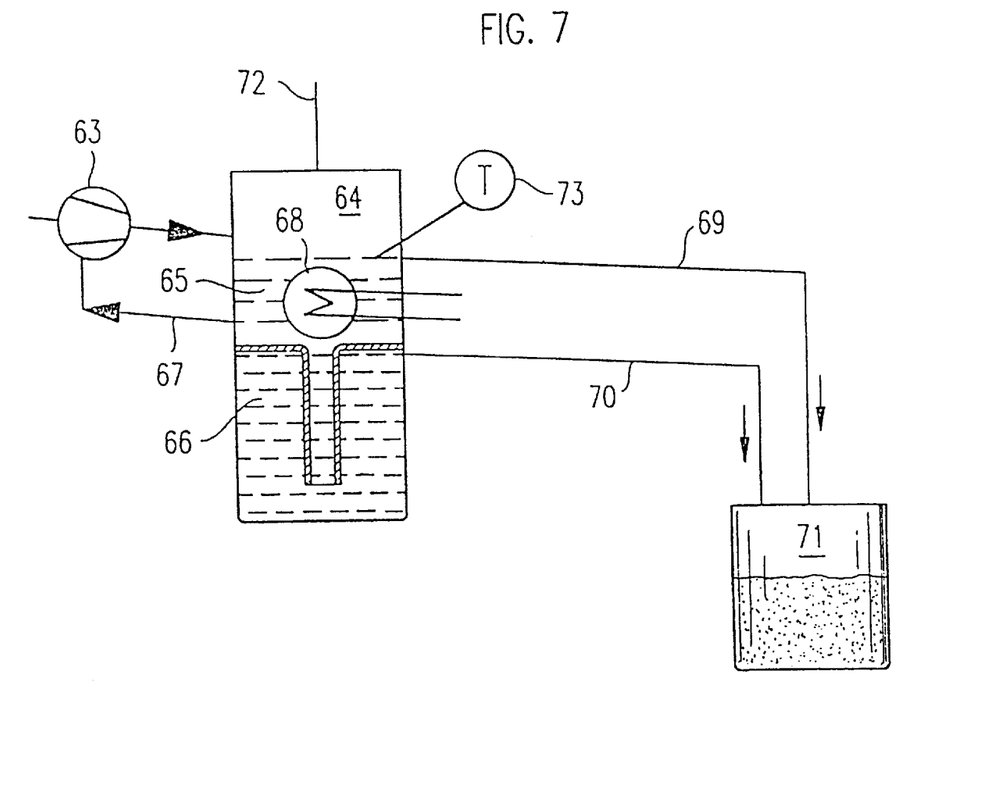

The uncondensed lower-boiling components are exhausted by vacuum pump 63 at the top of the condenser through pipeline 61 and nonreturn valve 62, as shown in FIG. 1. A preferred type of vacuum pump is a liquid ring pump 63 with a topped combinated product/water separator, as shown in FIG. 7. The ejected working liquid of liquid ring pump 63 is collected in container 64 and is cooled down by water cooler 68. In the lower part of container 64 is a water collector 66, which is connected with container 65 for low-boiling components by a syphon.

Cooled liquid from bath 65 is fed back to liquid ring pump 63 by pipeline 67.

The capacity of liquid ring pump 63 is chosen large enough that in running operation, the vacuum can be controlled by temperature of the ring liquid of the vacuum pump. Adjustment is done by temperature 73 and pressure 74 in evaporator 26.

Through the described arrangement in accordance with this invention, water is prevented from being fed back to the vacuum pump together with the working liquid from bath 65. Water would at once vaporize and destroy the vacuum as a consequence of its high vapor pressure compared with that of the product itself. Surplus of low-boiling fraction is let off through pipe 69, and surplus of water through pipe 70 into waste container 71.

Contained uncondensable gases escape through ventilation pipe 72.

The pure solvent, free of higher-boiling and of lower-boiling impurities, is let off at the bottom of condenser 40 through pipe 41 into a closed vessel 42. Solvent leaves the condenser at pipe 41 at the boiling temperature corresponding to the applied pressure of operation.

Vessel 42 operates as an automatic lock independently of whether the system is operated under vacuum or under normal pressure. The hot solvent flows by gradient through pipe 41, perhaps cooler 44, opened valve 49, and into the closed vessel 42. As vessel 42 is filled up, level switch 46 automatically closes valve 49. After a short delay, controlled by a timer, outlet valve 50 and ventilation valve 48 are opened. Contained pure solvent flows to tank 100. If tank 100 is arranged on a higher level than vessel 42, solvent can be pressured out of vessel 42 by compressed nitrogen or by compressed air, which is conducted into vessel 42 through valve 48. In case of use of compressed air, cool-down of the solvent by cooler 44 is useful for safety reasons. The solvent's temperature should be lower than its flash point inside vessel 42 and during pneumatic transport.

Level switch 47 closes valves 48 and 50, and opens valve 49 automatically when vessel 42 is empty.

During the start-up phase, as long as condenser 40 and its cooling circuit are cold, all incoming components, solvent, and also all lower-boiling impurities are condensed in condenser 40. The distilled fraction is contaminated at this point. During this phase, valve 100 will therefore be closed and valve 51 opened, so distilled solvent is conducted through pipeline 19 and inlet 7 back into feed tank 1. Once the temperature of coolant 53 and the difference of temperatures at coolant inlet 53 and outlet 56 reach the demanded values, valve 51 is closed and valve 100 will be opened. Reflow is stopped and clean solvent flows to pure solvent tank 100. Advantageously switch-over to clean solvent tank 100 can be made in dependence of temperature 75 at the top of condenser 40.

In order to avoid loss of time during start-up, it is useful to install a start-up heater 76 in the cooling circuit. By this start-up, heater condenser 40 can be heated up to the required operation temperature in a few minutes. Otherwise, distilled solvent from outlet 41 must be recycled to evaporator 26 because its quality is not acceptable.

From the foregoing description, it is evident that a distillation plant according to the invention separates out from a contaminated solvent a higher-boiling residue, which is extracted from the process by means 32,33,34,35 and 15. The separated-out fraction of lower-boiling impurities is extracted from the process by means 61,62,63,64,69,70,71 and 72. The fraction of lower-boiling impurities can include fractions of products and water.

By physical law, selectivity of separated out lower-boiling impurities whose percentage is very small compared to that of the main component decreases as the difference of boiling temperatures between main component (solvent) and lighter impurities become smaller. Operating results at an installation according to this invention show that even with decreasing differences of boiilng points of main product and lower-boiling impurities, a satisfying quality of distilled main product is reached if temperature at top 61 of condenser (see FIGS. 1,5 and 6) is held 10° C. to 20° C. higher than usual. Main distillate fraction is of acceptable quality, but the "waste" fraction of lower-boiling impurities contains up to 20% of total quantity of solvent.

Separating out of lower-boiling impurities with sufficient high-selectivity is possible by recycling the lower-boiling fraction with its high content of solvent alone a second time to the described distillation plant. The separated-out lower-boiling fraction of the lower-boiling fraction could be recycled one or more times. This stepwise redistillation causes little additional load on the distillation capacity if done as follows:

When solvent containing lower-boiling impurities is distilled the first time at high temperature at top 61 of condenser 40, about 10% to 20% or even more of total solvent are cut into lower-boiling fraction.

Then the light fraction outflowing through pipe 69 passes open valve 77 and is collected in vessel 80, as shown in FIG. 1. This fraction can be 10% or more of total quantity of distilled solvent. When vessel 80 is filled up, level switch 86 closes valve 10 or 11 of feed tank 1 and opens valve 83. By this, the light fraction from vessel 80 passes the distillation plant a second time. As outlet valve 83 is opened, inlet valve 77 is closed and inlet valve 78 of vessel 81 is opened. Now, the light fraction of the first light fraction from vessel 80 is collected in vessel 81. Valves 10 and 11 remain closed. When vessel 80 has become empty, level switch 87 closes valves 83 and 78 and valves 84 and 79 are opened. Now, the second light fraction from vessel 81 passes distillation. Separated-out solvent from outlet 41 flows to clean solvent tank 100. The light fraction which is now highly-enriched with lower-boiling components flows to vessel 82. When vessel 81 has become empty, level switch 89 closes valves 84 and 79 and opens valve 85. The highly-enriched low-boiling fraction flows through open valve 85 to waste container 15. As valves 84 and 79 are closed, the outlet valves 10 or 11 are opened and normal distillation from feed tank 1 starts again. Through opened valve 77, lower-boiling fraction is conducted to vessel 80.

By a cascade process as desribed above, which uses three or even more stages, a high-purity of solvent at outlet 41 flowing to tank 100 can be reached, and at the same time, a high concentration of lower-boiling impurities in the waste fraction. This causes only very little loss of solvent and low additional load on distillation capacity.

The sizes of vessels 80, 81, 82 should be as follows: Vessel 80 should be large enough to store 25% to 30% of total hourly capacity of the distillation plant. Vessel 81 has about 25% to 30% of volume of vessel 80; vessel 82 has about 25% to 30% of volume of vessel 81. By these sizes of vessels 80 to 82, multistage redestillation of lower-boiling fractions and their upgrading can be made batchwisely, all in 60 to 80 minutes. If in the first distillation step, 20% of total solvent are cut into the light fraction to gain high quality solvent, additional burden on distillation capacity from multistage redistillation is about 25%. This result is better and more economic than a reduction of temperature at top 61 of condenser which reduces solvent loss contained in light fraction in the first step, but contaminates the pure solvent fraction by an increasing content of lower-boiling impurities.

What is claimed is:

1. Apparatus for the recovery of purified solvent from contaminated solvent with separation of contaminants, comprising an evaporator (26) for the separation of contaminants whose boiling point is higher than the boiling point of the purified solvent, and a condenser (40) following the evaporator (26) for the separation of contaminants whose boiling point is lower than the boiling point of the purified solvent, the condenser (40) having an inlet for the vapor coming from the evaporator (26), an outlet for condensed liquid solvent, as well as an outlet for the vaporous contaminants whose boiling point is lower than the boiling point of the pure solvent, a closed, separate cooling circuit from which coolant flows through the condenser (40), the closed cooling circuit having a regulating system (58, 59) which consists of a cooler (58) and a control valve (59) disposed in a bypass to the cooler (58) which valve (59) is operated by the temperature of the vaporous contaminants upon issuing from the condenser (40), thus adjusting the temperature of the coolant upon entry into the condenser (40), which thus serves for adjusting the temperature of the vaporous contaminants issuing from the condenser (40) at the same side of condenser (40) as the coolant of the closed cooling circuit enters the condenser (40), the closed cooling circuit having a circulation pump (60) for regulating the rate of flow of the coolant in the condenser, which thus serves to adjust the temperature of the condensed purified solvent as it leaves the condenser (40) at the same side of condenser (40) as the coolant leaves the condenser (40).

2. Apparatus according to claim 1, wherein the purified solvent can be taken from condenser (40) through a lock system (42) which can be preceded by a cooler (44).

3. Apparatus according to claim 1 further comprising a liquid-ring vacuum pump (63) on the outlet of condenser (40) for the vaporous contaminants, which draws and condenses vapor from said outlet of condenser (40) to form a condensate, and ejects said condensate to a topped combined product/water separator (64/71) whose central part (65) has a bath provided with a cooling coil (68) for the condensate, and from which moisture-free working fluid for the liquid ring pump is taken, and whose bottom part has a separating tank for separated water.

4. Apparatus according to claim 3, wherein the combined product/water separator (64,71) has two overflows by which excess contaminants (69) and the water (70) are carried away separately and can be disposed of.

5. Apparatus according to claim 3 wherein the product/water separator (64/71) and the evaporator (26) are connected through at least one collecting tank (80,81,82) for receiving the vaporous contaminants carried out of condenser (40) as well as solvents evaporated with them, for the purpose of feeding them at least one additional time through evaporator (26) and to the condenser for redistillation.

6. Apparatus according to claim 1, wherein the evaporator contains in the lower part a heated bottom and a level-controlled solvent bath which is held to a volume of 5% to 20% of the amount hourly recovered, and above the bath surface contains the inlet for the contaminated solvent to be distilled.

7. Apparatus according to claim 1, wherein said evaporator (26) has an inlet (30) for contaminated solvent, and a filter layer (A, B) is disposed above the inlet (30).

8. Apparatus according to claim 1 further comprising a settling tank (1) before evaporator (26) to separate sedimented water and sludge from the contaminated solvent, having outlets (10,11) situated at different levels, which are shut off by corresponding float switches (2,3) disposed beneath each of them when they become buoyant.

9. Apparatus according to claim 8, wherein the float switches (2, 3) are buoyant in water but not in solvent.

10. A process for the recovery of purified solvent from a contaminated solvent, which comprises a) feeding the contaminated solvent to an evaporator (26) and separating the solvent from the contaminants that have a higher boiling point than the solvent by evaporation in the evaporator, to produce a vapor stream of solvent, which leaves the top of the evaporator, while the higher boiling contaminants remain in the liquid state in the bottom of the evaporator;

b) feeding the vapor stream to a condenser (40) and condensing the solvent, by partial condensation, while the contaminants which have a lower boiling point than the solvent remain in the vapor state;

c) removing condensed solvent from the bottom of the condenser as a liquid stream and uncondensed vapor containing the lower-boiling contaminants from the top of the condenser (40) as a vapor stream and, d) regulating the temperature of the vapor stream leaving the condenser and the temperature of the condensed solvent liquid stream leaving the condenser independently of each other by means of a closed separate cooling circuit, the coolant of which enters the condenser at the same end that the vapor stream leaves the condenser, and leaves the condenser at the same end as the condensed liquid solvent stream leaves the condenser, by adjusting the temperature of the coolant entering the condenser (40) in accordance with the temperature of the vapor stream leaving the condenser, to maintain the temperature of the vapor stream at a predetermined set point; and adjusting the flow rate of the coolant flowing through the condenser (40) in accordance with the temperature of the condensed liquid solvent stream leaving the condenser to maintain the temperature of the condensed liquid solvent stream leaving the condenser at a predetermined set point.

11. Process according to claim 10, wherein the separate, closed cooling circuit as well as condenser (40) are brought to the desired working temperature before or at the start of the process by a start-up heater (76).

12. Process according to claim 10, wherein prior to feeding into evaporator (26), the contaminated solvent is heated by a continuous-flow heater (22) to the feeding temperature, which is between about 10° C. and about 20° C. above the evaporation temperature of the solvent at the internal pressure prevailing in the evaporator.

13. Process according to claim 10, wherein solvent bath (29) is concentrated to a non-evaporable residue manually or by means of a time switch by periodically interrupting the feeding of solvent into the evaporator for a period of 3 to 12 minutes, and then the residue is pumped entirely out of evaporator (26).

14. Process according to claim 10, wherein the vaporous contaminants, as well as any solvent evaporated therewith, which are removed from condenser (40) are fed at east one additional time to evaporator (26) and to condenser (40) and thus are redistilled in at least one redistillation step.

15. Process according to claim 14, wherein during the redistillation, no feeding of fresh contaminated solvent to evaporator (26) takes place, and that the vaporous contaminants as well as the coevaporated solvent are collected in a separate tank (80, 81, 82) after each redistillation step.

* * * * *